United States Patent
Bühler

(10) Patent No.: US 6,943,231 B2
(45) Date of Patent: Sep. 13, 2005

(54) TRANSPARENT POLYAMIDE MOLDING MATERIALS HAVING IMPROVED TRANSPARENCY, RESISTANCE TO CHEMICALS AND HIGH PERMANENT FATIGUE STRENGTH

(75) Inventor: Friedrich Severin Bühler, Thusis (CH)

(73) Assignee: EMS-Chemie AG, Domat/EMS (CH)

( * ) Notice: Subject to any disclaimer, the term of this patent is extended or adjusted under 35 U.S.C. 154(b) by 80 days.

(21) Appl. No.: 10/452,574

(22) Filed: Jun. 2, 2003

(65) Prior Publication Data

US 2003/0235666 A1 Dec. 25, 2003

(30) Foreign Application Priority Data

Jun. 5, 2002 (DE) ........................ 102 24 947

(51) Int. Cl.$^7$ ........................ C08G 69/26; B29D 11/00; B29D 12/00; B29D 23/00; C08L 77/00
(52) U.S. Cl. ........................ 528/310; 528/335; 528/336; 528/338; 528/339; 528/340; 528/346; 528/347; 524/538; 524/606; 524/607; 525/432; 428/474.4; 428/411.1; 428/357; 428/394; 428/395; 428/457; 264/1.1; 264/1.6; 264/1.9; 264/2.7; 264/299; 264/319; 264/320; 264/328.1; 264/500; 264/506; 264/509; 264/511; 264/512; 264/513; 264/514; 264/515; 264/563
(58) Field of Search ................................ 528/310, 340, 528/338, 339, 346, 335, 347, 336, 349; 524/606, 607, 538; 525/432, 410; 428/474.4, 411.1, 394, 395, 357, 457

(56) References Cited

U.S. PATENT DOCUMENTS

| | | | | |
|---|---|---|---|---|
| 4,369,305 A | * | 1/1983 | Pagilagan ................ | 528/338 |
| 5,166,312 A | * | 11/1992 | Wenzel et al. ........... | 528/340 |
| 5,300,557 A | * | 4/1994 | Bartmann et al. ....... | 524/606 |
| 5,360,891 A | * | 11/1994 | Wenzel et al. ........... | 528/335 |
| 5,696,202 A | * | 12/1997 | Torre ...................... | 524/606 |
| 5,886,087 A | * | 3/1999 | Dalla Torre ............. | 524/538 |
| 6,008,288 A | * | 12/1999 | Dalla Torre ............. | 524/538 |
| 6,277,911 B1 | * | 8/2001 | Torre ...................... | 524/606 |
| 6,528,560 B2 | * | 3/2003 | Bühler .................... | 524/123 |

FOREIGN PATENT DOCUMENTS

| | | |
|---|---|---|
| CH | 673 029 A5 | 1/1990 |
| DE | 2 034 541 | 1/1972 |
| DE | 36 00 015 C2 | 3/1988 |
| DE | 196 42 885 A1 | 4/1988 |
| DE | 37 17 928 C2 | 10/1989 |
| DE | 43 10 970 A1 | 6/1994 |
| EP | 0 725 101 | 7/1996 |
| EP | 0 628 602 B | 10/2001 |

OTHER PUBLICATIONS

Macromolecules; 1971; 4(3); pp. 347–350, "The Effect of Isomer Ratio on the Properties of Bis(4–aminocyclohexyl)methane Polyamides", Frank R. Prince et al.*

* cited by examiner

Primary Examiner—P. Hampton Hightower
(74) Attorney, Agent, or Firm—Bell, Boyd & Lloyd LLC

(57) ABSTRACT

Transparent polyamide molding materials are provided which are characterized in that they have a melting enthalpy between 0 and 12 J/g and the polyamides are constituted of 100 mole-% of a diamine mixture having 10–70 mole-% of PACM [bis-(4-amino-cyclohexyl)-methane] with less than 50 wt.-% of trans,trans-isomer and 90–30 mole-% of MACM [bis-(4-amino-3-methyl-cyclohexyl)-methane], wherein, optionally, 0–10 mole-% can be replaced by other aliphatic diamines having 6 to 12 C atoms, cycloaliphatic, alkyl-substituted cycloaliphatic, branched aliphatic diamines or multiamines having 3 to 12 amino groups or mixtures thereof, and 100 mole-% of long-chain aliphatic dicarboxylic acids having 8 to 14 C atoms or mixtures of these dicarboxylic acids, wherein 0–10 mole-% can be replaced by other aromatic or cycloaliphatic dicarboxylic acids having 8 to 16 C atoms, which are especially selected from the group consisting of isophthalic acid, terephthalic acid, naphthalenedicarboxylic acid, cyclohexanedicarboxylic acid or mixtures thereof, and wherein, optionally, 0–10 mole-% of the other long-chain aliphatic diamines and 0–10 mole-% of the other long-chain aliphatic dicarboxylic acids can be added as 0–20 mole-% of ω-aminocarboxylic acids having 6 to 12 C atoms or lactams having 6 to 12 C atoms.

Further, methods for producing the polyamide moulding materials and methods for producing and further treating moulded articles from the polyamide moulding materials are provided. Especially, the present invention relates to glasses and lenses which are obtainable from the polyamide moulding materials.

53 Claims, No Drawings

TRANSPARENT POLYAMIDE MOLDING MATERIALS HAVING IMPROVED TRANSPARENCY, RESISTANCE TO CHEMICALS AND HIGH PERMANENT FATIGUE STRENGTH

BACKGROUND OF THE INVENTION

The invention relates to transparent polyamide moulding materials. More specifically, the present invention relates to polyamide moulding materials having an optimum transparency and optimum chemical resistance as well as high permanent fatigue strength.

Two polymer types are known in the field of transparent polyamides having a high light transmission, high permanent fatigue strength and excellent chemical resistance.

Microcrystalline, transparent polyamide moulding materials having excellent chemical resistance, especially to alcohols, which are produced from PACM having 35–60 mole-% of the bis-(4-aminocyclohexyl)methane trans,trans-isomer, 65–40 mole-% of other diamines and dodecanedioic acid are known by DE 43 10 970. A disadvantage is the low glass transition temperature (Tg) being 140° C. and the low stiffness. Due to the microcrystalline phases, the transparency does not achieve the optimum. The permanent fatigue strength for these polyamide types for defined initial bending stresses shows low numbers of cycles to break in fatigue test after Wöhler.

Amorphous, transparent polyamide moulding materials which have high chemical and thermal resistances and an excellent permanent fatigue strength to fatigue test after Wöhler and which are constituted from MACM (bis-(4-amino-3-methyl-cyclohexyl)-methane) and dodecanedioic acid are known by EP-A-0 725 101. With regard to the microcrystalline, transparent polyamides, the resistance to alcohols is lower. The transparency is comparable to the PACM12 types, but is not yet optimum.

DE 196 42 885 C2 describes amorphous, transparent polyamide moulding materials containing at least a second homopolyamide which show an excellent permanent fatigue strength besides the properties described in EP-A-0 725 101 and which are suitable for producing moulded parts for electro-optical applications such as lenses for sunglasses and opticals waveguides.

At mechanical loading of the surfaces, transparent polyamides have a high abrasion resistance and a good scratch resistance which can be further improved by a coating with hard lacquer.

Transparent polyamides are advanced polymers which are used especially in the field of aggressive media and in the field of high pressure load and high permanent fatigue strength. Simultaneously, transparent polyamides have high glass transition temperatures (Tg) and achieve high thermal resistance.

For example, aggressive media at high temperatures are present in dish-washers or media-conducting systems to which transparent mass-produced materials such as PS (polystyrene), PMMA (poly(methyl methacrylate)), PET (polyethylene terephthalate), PVC (poly(vinyl chloride)) or PC (polycarbonate) do not resist. Application examples are baby bottles, bottles for carbonating, dinner-service and cutlery handles. For example, resistance to chemicals in connection with thermal resistance and permanent fatigue strength are required for viewing glasses in the field of heating techniques and service stations having direct fuel or oil contact, filter cups for drinking water treatment and media filtration, flowmeter for gases or liquid media, lamp cases, reflectors for auto lamps and sensors. The importance of transparent polyamides for external use increases because high weathering resistances are achieved by a combination of cycloaliphatic diamines having long-chain aliphatic dicarboxylic acids, which can be adjusted optimally by the tertiary butylphenol class and HALS types stabilizers.

Further, lacquering processes require chemical resistance to avoid stress cracks to the solvents, but require simultaneously an activability of the surfaces to achieve an optimum lacquer adhesion. Numerous lacquers such as hard lacquers for increasing the scratch resistance require hardening temperatures up to 130° C.

High permanent fatigue strength in combination with a very good thermal and chemical resistance are required also in the field of spectacles and safety spectacles besides the engine construction and the medicinal techniques.

Spectacle glasses for sunglasses and correction spectacles can be produced due to the favorable optical properties such as refractive index and Abbe coefficient and transparency. Also, lenses for technical devices, lights or signal lamps, opto-electronic couplers or LEDs can be produced. These applications require the optical properties as well as an improved transparency and clarity as well as simultaneously a high temperature stability with a very low discoloration of the materials. The combination of suitable properties for spectacle frames and spectacle lenses of amorphous polyamides having an excellent resistance to chemicals and stress cracks allows new design forms for spectacles having bores for positioning screws directly in the spectacle glass, which leads to cracks and breaks for traditionally used materials such as glass, PC or PMMA.

SUMMARY OF THE INVENTION

It is an advantage of the present invention to provide polyamide-based moulding materials having an optimum transparency and optimum chemical resistance as well as a high permanent fatigue strength and to provide moulded articles being obtainable therefrom to provide especially spectacles or lenses having an optimum transparency and optimum chemical resistance as well as a high permanent fatigue strength.

Further, it is an advantage of the present invention to provide methods for producing the moulding materials according to the invention, moulded articles, spectacles and lenses.

To this end, the present invention provides transparent polyamide moulding materials constituted of mixtures of the diamines PACM (bis-(4-amino-cyclohexyl)-methane) and MACM (bis-(4-amino-3-methyl-cyclohexyl)-methane) and long-chain aliphatic dicarboxylic acids and having an optimum transparency and optimum chemical resistance as well as a high permanent fatigue strength.

Further, the present invention provides methods for producing the moulding materials according to the invention and methods for producing and further treating moulded articles from the moulding materials according to the invention. Especially, the present invention relates to spectacles and spectacle glasses or eyeglasses, respectively, which are obtainable from the polyamide moulding materials according to the invention.

The term PACM used in this application represents the ISO-name bis-(4-amino-cyclohexyl)-methane which is commercially available under the commercial name 4,4'-diaminodicyclohexylmethane as dicycane type (CAS no.

1761-71-3). The term MACM represents the ISO-name bis-(4-amino-3-methyl-cyclohexyl)-methane which is commercially available under the commercial name 3,3'-dimethyl-4,4'-diaminodicyclohexylmethane as LAROMIN C260 type (CAS no. 6864-37-5).

It is intended in the spirit of the present invention that the terms PACM and MACM, respectively, include all trivial names, commercial names or other names being common to those skilled in the art and corresponding to the chemical structures of the above compounds.

Additional features and advantages of the present invention are described in, and will be apparent from, the following Detailed Description of the Invention and the figures.

DETAILED DESCRIPTION OF THE INVENTION

According to the invention the advantages are achieved by providing transparent polyamide moulding materials being characterized in that the polyamides have a melting enthalpy between 0 and 12 J/g and the polyamides are constituted of A. 100 mole-% of a diamine mixture having 10–70 mole-% of PACM [bis-(4-amino-cyclohexyl)-methane] with less than 50 wt.-% of trans,trans-isomer and 90–30 mole-% of MACM [bis-(4-amino-3-methyl-cyclohexyl)-methane], wherein, optionally, 0–10 mole-% can be replaced by other aliphatic diamines having 6 to 12 C atoms, cycloaliphatic, alkyl-substituted cycloaliphatic, branched aliphatic diamines or multiamines having 3 to 12 amino groups or mixtures thereof, and B. 100 mole-% of long-chain aliphatic dicarboxylic acids having 8 to 14 C atoms or mixtures of these dicarboxylic acids, wherein 0–10 mole-% can be replaced by other aromatic or cycloaliphatic dicarboxylic acids having 8 to 16 C atoms, which are especially selected from the group consisting of isophthalic acid, terephthalic acid, naphthalenedicarboxylic acid, cyclohexanedicarboxylic acid or mixtures thereof, and wherein, optionally, 0–10 mole-% of the other long-chain aliphatic diamines and 0–10 mole-% of the other long-chain aliphatic dicarboxylic acids can be added as 0–20 mole-% of ω-aminocarboxylic acids having 6 to 12 C atoms or lactams having 6 to 12 C atoms.

The special advantage of the polyamide moulding material according to the invention is that the used diamine mixture which is in the range of 30–90% MACM and preferably in the range of 30–70% MACM shows an optimum transparency and minimum discoloration as well as maximum elongation at break. Simultaneously, notched-impact strength and chemical resistance are on a high level. The chemical resistance is adjusted in such a way that moulded articles which are produced from the polyamide moulding materials according to the invention can be treated with usual after-treatment techniques, e. g. lacquering, printing, coating, vapor-depositing etc. Excellent values are obtained for a main property of the transparent polyamides, the permanent fatigue strength, which is required, for example, in drinking water systems, where spontaneous pressure changes occur frequently during opening and closing the cocks. The permanent fatigue strength which is measured in form of number of cycles to break in fatigue test after Wöhler achieves in moulded articles which are produced from polyamide moulding materials according to the invention high values compared to other polyamides and a multiple of the achievable values such as for moulded articles made of polycarbonate, polystyrene, SAN or poly(methyl methacrylate).

Transparent polyamides which are produced from aliphatic, cycloaliphatic or alkyl-substituted aliphatic or cycloaliphatic monomers on optimumly adjusted large-scale plants (5–10 to) show due to a lack of aromatic absorption with 92% at 560 nm in the moulded article having a wall thickness of 2 mm a higher light transmission in the visible and near-infrared range as, for example, polystyrene (PS) or polycarbonate (PC) with 89% similar to the poly(methyl methacrylates) (PMMA) with 92%. The light transmission has a decisive importance in the high-quality transparent applications and is increased to maximum values by coating the surfaces with suitable protecting lacquers.

The optimum resistance to formation of stress cracks in, for example isopropanol, is obtained in the range of 45–0 mole-% of MACM and 65–100 mole-% of PACM. In this range, crystalline phases are present which do not impair the transparency and have melting enthalpies between 8 and 25 J/g.

The stress at break and elongation at break of the polyamide moulding materials according to the invention have an optimum in the range of 30–90 mole-% of MACM and 70–10 mole-% of PACM. Simultaneously, moulded articles having a high notched-impact strength and high permanent fatigue strength are obtained.

A possible reason for the advantageous transparency behaviour of the composition according to the invention is the low crystallinity in a defined range of the melting enthalpy of from 0 to 12 J/g and the reduction of the alkyl-substituted diamines. The transparency decreases for a melting enthalpy above 12 J/g.

With regard to pure MACM12 and PACM12 polyamide types which are produced on pilot autoclaves, the transparency increases from 80 to 85% at 540 nm, as measured on plates made of unpolished moulds having a thickness of 3 mm, for a composition of the diamines PACM/MACM of 60/40 mole-%. As experience shows, the light transmission is higher for plates made of polished moulds.

Simultaneously, lower discolorations are measured according to ASTM D1925 on plates having a thickness of 3 mm for the range of from 30 to 40 mole-% of MACM despite constant production conditions.

Also, the stress at break and elongation at break show an unexpected maximum of 62 MPa and 160% of elongation in the range of 40–60 mole-% of MACM.

By increasing the PACM amount, the resistance to stress crack to isopropanol increases of from 15 to 59 MPa of bending stress up to crack formation and achieves the maximum already in the composition range according to the invention of from 30–90 mole-% of MACM. Also, a corresponding behaviour is found for hexane and acetone.

The notched-impact strength at 23° C. is on a stable level of 11 KJ/m$^2$ for all compositions and shows slight advantages for high PACM amounts with 12 KJ/m$^2$. Especially, these polyamide types are characterized in that the notched-impact strengths, also when measured at −70° C., do not show a decrease, as it is known for polycarbonate (PC) and polyester. Other transparent materials such as polystyrene (PS) or poly(methyl methacrylate) (PMMA) have already 5 to 10 times lower values at 23° C.

In a fatigue test at an initial bending stress of approx. 50 MPa, the polyamide moulding materials which are produced on pilot autoclaves achieve a maximum in the composition range of 20–40 mole-% of MACM with number of cycles to break from 0.3 to 0.4 mio. cycles and show highest permanent fatigue strength. When the polyamide moulding materials are produced on production plants having a vessel volume of 1 to 10 cubic meter, the values are higher with 1.0 mio. cycles for MACM12 and 0.6 mio. cycles for PACM12, as experience shows.

Preferred are transparent polyamide moulding materials which are constituted of 100 mole-% of a diamine mixture having 30–70 mole-% of bis-(4-amino-cyclohexyl)-methane with less than 50 wt.-% of trans,trans-isomer and 70–30 mole-% of bis-(4-amino-3-methyl-cyclohexyl)-methane and 100 mole-% of dodecanedioic acid (DDS) or sebacic acid (SS) or azelaic acid (AS) or mixtures thereof.

Especially preferred are transparent polyamide moulding materials which are constituted of 100 mole-% of a diamine mixture having 40–70 mole-% of bis-(4-amino-cyclohexyl)-methane with less than 50 wt.-% of trans,trans-isomer and 60–30 mole-% of bis-(4-amino-3-methyl-cyclohexyl)-methane and 100 mole-% of dodecanedioic acid.

Especially preferred are transparent polyamide moulding materials which are constituted of 100 mole-% of a diamine mixture having 50–70 mole-% of bis-(4-amino-cyclohexyl)-methane with less than 50 wt.-% of trans,trans-isomer and 50–30 mole-% of bis-(4-amino-3-methyl-cyclohexyl)-methane and 100 mole-% of dodecanedioic acid.

Further, polyamide moulding materials are especially preferred, which are constituted of 100 mole-% of a diamine mixture having 50–70 mole-% of bis-(4-amino-cyclohexyl)-methane with less than 50 wt.-% of trans,trans-isomer of the dicycane type with the commercial name 4,4'-diaminodicyclohexylmethane (CAS no. 1761-71-3 of the company BASF) and 50–30 mole-% of bis-(4-amino-3-methyl-cyclohexyl)-methane of the LAROMIN C260 type with the commercial name 3,3'-dimethyl-4,4'-diaminodicyclohexylmethane (CAS no. 6864-37-5 of the company BASF) and 100 mole-% of dodecanedioic acid.

For adjusting the desired relative viscosity, as measured in 0.5% of m-cresol solution, to 1.65–2.00, preferably 1.80 to 1.95, either the diamine or the dicarboxylic acids can be used in low excess of from 0.01 to 1 mole-%. The regulation by monoamine or monocarboxylic acids in amounts of from 0.01 to 2.0 wt.-%, preferably 0.05 to 0.5 wt.-%, is preferred.

Suitable modifiers are benzoic acid, acetic acid, propionic acid, stearylamine or mixtures thereof. Especially preferred are modifiers having amine or carboxylic acid groups comprising HALS type or tertiary butylphenol type stabilizer groups such as triacetone diamine or isophthalic acid di-triacetone diamine derivates.

Suitable catalysts for accelerating the polycondensation reaction are phosphoric acids selected from the group consisting of $H_3PO_2$, $H_3PO_3$, $H_3PO_4$, salts thereof or organic derivates thereof, which lead simultaneously to a reduction of the discoloration during processing. The catalysts are added in the range of from 0.01–0.5 wt.-%, preferably 0.03–0.1 wt.-%.

Suitable defoaming agents for preventing foam formation during degassing are aqueous emulsions containing silicones or silicone derivates in the range of from 0.01 to 1.0 wt.-%, preferably 0.01 to 0.10 for 10% emulsion.

Suitable heat or UV stabilizers can be added already before the polycondensation to the formulation in amounts of from 0.01 to 0.5 wt.-%. Preferably, high-melting types are used. IRGANOX 1098 or HALS types are especially preferred.

The production of polyamide moulding material according to the invention is performed in known pressure vessels. First, a pressure phase is run at 260–310° C. Then, a pressure release follows at 260–310° C. Degassing is performed at 260–310° C. Then, the polyamide moulding material is discharged in strand form, cooled in a water bath with 5–80° C. and pelletized. The pellets are dried for 12 h at 80° C. to a water content of below 0.06%.

During drying while simultaneously circulating the pellets, additives such as lubricants, dyes, stabilizers or other can be applied onto or melted onto the hot pellets.

The finishing of the transparent moulding materials according to the invention with additives such as stabilizers; lubricants such as paraffin oils or stearates; dyes; fillers; impact modifiers such as terpolymers made of ethylene glycidyl methacrylate, especially with a refractive index in the range of the moulding materials according to the invention or maleic anhydride grafted polyethylenes, propoylenes; or reinforcing agents such as transparent dispersable nano-particles or glass spheres or glass fibres; or mixtures of the additives; can be done by a known mixing method below, especially by extrusion on single- or multi-shaft extruders with melt temperatures between 250 to 350° C., but increases the resulting yellow tinge which can be significantly reduced by adding $H_3PO_3$ or other phosphoric compounds.

Especially suitable stabilizers for producing polyamide moulding materials of the invention according to the extrusion method for applications in the external field such as spectacle glasses, clock cases, filter cups, lamp cases, protecting coverings, glazings, sport and leisure articles, or viewing glasses at roadside petrols are HALS type UV stabilizers such as TINUVIN 770 and TINUVIN 312 and tertiary butylphenol type antioxidant agents such as IRGANOX 1010, IRGANOX 1070, IRGANOX 1098, which can be used alone or in combination.

Especially suitable additives for producing polyamide moulding materials of the invention according to the extrusion method for applications such as spectacle glasses are UV absorbers which filter completely out wavelengths below 400 nm and which can be for example Tinuvin 327 or 326 or 312 or other chlorinated hydroxy-phenyl-benztriazene types and which are added in amounts of from 0.1 to 1.0 wt.-%. Further, dyes dispersible in polyamide are especially suitable additives.

Transparent blends which are obtainable by an extrusion method on single- or multi-shaft extruders with melt temperatures between 250 to 350° C. and from 100 to 30 wt.-% of the transparent moulding materials according to the invention and 0 to 70 wt.-% of polyamide 12 or polyamide 11, can further comprise a second microcrystalline phase having a melting point of 170–175° C. and further improving the chemical resistance.

Suitable methods for producing highly transparent moulded articles from the transparent polyamide moulding materials according to the invention are injection moulding methods, injection-compression moulding methods at melt temperatures of 230 to 320° C., wherein the mould is adjusted to temperatures of 40 to 120° C.

Especially suitable methods for producing highly transparent moulded articles from the transparent polyamide moulding materials according to the invention are injection moulding methods, injection-compression moulding methods at melt temperatures of 230 to 320° C., wherein the mould having temperatures of from 40 to 130° C. applies an embossed printing on the hot moulded article after filling the cavity.

Especially suitable methods for producing faultless stress-poor surfaces of the moulded article such as lenses for spectacles from transparent polyamide moulding materials according to the invention is an expansion injection-compression moulding process, wherein cavities having wall thicknesses of from 1–5 mm are filled and then the mould cavity is spread out to higher wall thicknesses at permanent filling.

Suitable methods for producing sheets, pipes and semi-finished products in single- or multi-layer construction from the transparent polyamide moulding materials according to the invention are extrusion methods on single- or multi-shaft extruders with melt temperatures between 250 to 350° C., wherein depending on compatibility of the different layer materials, suitable bonding agents in the form of corresponding copolymers or blends can be used.

Moulded articles which are constituted of the polyamide moulding materials according to the invention can be bonded to one another according to usual methods such as by ultrasonic welding, glowing wire welding, friction welding, spin welding or laser welding by finishing with lasing dyes having an absorption in the range of 800 to 2000 nm.

Suitable methods for producing hollow bodies and bottles in single- or multi-layer construction from the transparent polyamide moulding materials according to the invention are injection blow methods, injection stretch-blow methods and extrusion blow methods.

Suitable applications for moulded articles which are constituted of the transparent polyamide moulding materials according to the invention are viewing glasses for heating techniques with direct oil contact, filter cups for drinking water treatment, baby bottles, bottles for carbonating, dinner-service, flowmeters for gases or liquid media, clock cases, wrist watch cases, lamp cases and reflectors for car lamps.

Especially suitable applications for moulded articles which are constituted of the transparent polyamide moulding materials according to the invention are spectacle glasses for sunglasses or safety spectacles, lenses for correction spectacles, lenses for technical devices, Fresnel lenses for projectors, lights or signal lamps and prisms.

Spectacle glasses or eyeglasses, respectively, which are obtainable from the polyamide moulding materials of the invention according to an especially suitable method can be tinted by a dipping method with alcoholic, ester-containing, ketone-containing or water-based pigment solutions, and corrected by dipping in acetone, and coated by usual hard lacquers which can be thermically or UV hardening and which can contain UV protection or dye pigments or antistatic finishing or antifogging finishing or other functional additives.

Spectacle glasses which are obtainable from the polyamide moulding materials of the invention according to an especially suitable method can be coated by a vapor-deposition method with metals, lumenized, metal-coated or finished in other usual form.

Further, spectacle glasses are obtainable from the polyamide moulding materials of the invention according to an especially suitable method can be produced by overmoulding polarizing sheets or composites of polarizing sheet, an adhesive layer and a layer of the polyamide moulding material of the invention on both side.

Alternatively, spectacle glasses which are obtainable from the polyamide moulding materials of the invention according to an especially suitable method can be produced by overmoulding protecting sheets of the polyamide moulding material according to the invention which are loaded with phototropic substances.

Spectacle glasses which are constituted of the polyamide moulding material according to the invention can be adapted in all spectacle frames customary in trade without risk for stress cracks in the spectacle glasses being caused by plasticized spectacle frames or cracks or breaks being generated in the spectacle glass by too high adapting stresses of metal frames.

Spectacle frames and spectacle glasses which are constituted of the polyamide moulding materials according to the invention can be produced directly in a form of an integral complete spectacle consisting of glass, frame and bow.

Preferred joining methods of spectacle frames and spectacle glasses for modern spectacle design which are constituted of polyamide moulding materials according to the invention are screwed connections, wherein the bores are directly arranged in the spectacle glass.

Preferred fixing methods of spectacle frames and spectacle glasses for modern spectacle design which are constituted of polyamide moulding materials according to the invention are clamped or detachable snap connections, wherein at least one fixing element is placed directly in the contour of the spectacle glass.

Now, the invention is explained by examples which are however only exemplary and do not limit the scope of the invention.

The production of the polyamide moulding materials according to the invention is performed in known pilot pressure autoclaves having a volume of 130L. First, a pressure phase at 290° C. is run. Then, the pressure release follows at 280° C. Degassing is performed at 280° C. Then, the polyamide moulding material is discharged in strand form, cooled in a water bath with room temperature and pelletized. The pellets are dried for 12 h at 80° C. to a water content of below 0.06%.

The production of highly transparent moulded articles from the transparent polyamide moulding materials according to the invention was performed on an Arburg injection moulding machine at melt temperatures of 280° C., wherein the mould was adjusted to the temperature of 60° C.

By way of example and not limitation, examples of the present invention will now be given.

COMPARISON EXAMPLE 1 (DE 196 42 885 C2)

17.91 kg of MACM (LAROMN C260=3,3'-dimethyl-4,4'-diaminodicyclohexylmethane; CAS no. 6864-37-5 from the company BASF), 17.04 kg of DDS (dodecanedioic acid; DuPont), 48.65 g of benzoic acid, 8.75 g of hypophosphorous acid, 40 g of IRGANOX 1098 (Ciba) and 40 kg of soft water were filled in a 130L pressure autoclave. Then, the autoclave was closed and heated-up to 290° C. with stirring. After a pressure phase for 2 h, it was released to external pressure within 1.5 h and degassed for approx. 1 h at 280° C. Then, the material was discharged in form of strands, cooled in water bath, pelletized and dried for 12 h at 80° C. A transparent material having characteristic properties according to table 1 was formed.

EXAMPLES 2–7

The composition of the diamines MACM (LAROMIN C260=3,3'-dimethyl-4,4'-diaminodicyclohexylmethane; CAS no. 6864-37-5 from the company BASF), and PACM (dicycane =4,4'-diaminodicyclohexylmethane, CAS no. 1761-71-3 from the company BASF) is according to table 1 and the residual composition is according to comparison example 1. The operating was performed in an analogous manner to comparison example 1. Materials having characteristic properties according to table 1 were formed.

COMPARISON EXAMPLE 8 (DE 43 10 970)

The composition PACM (dicycane=4,4'-diaminodicyclohexylmethane, CAS no. 1761-71-3 from the company BASF) is according to table 1/CE8 and the residual composition is according to comparison example 1. The operating was performed in an analogous manner to comparison example 1. Materials having characteristic properties according to table 1 were formed.

The moisture content was measured according to the method ISO 155/12, wherein the moisture is stripped by heating-up and supplied to the Karl Fischer reagent.

The notched-impact strength (NIS) was determined according to ISO 179/eA.

TABLE 1

Test results

| Example | | CE1 mole % | E2 mole % | E3 mole % | E4 mole % | E5 mole % | E6 mole % | E7 mole % | CE8 mole % |
|---|---|---|---|---|---|---|---|---|---|
| MACM | Laromin C260 | 100 | 75 | 50 | 40 | 35 | 30 | 25 | 0 |
| PACM | dicycane | 0 | 25 | 50 | 60 | 65 | 70 | 75 | 100 |
| DDS | | 100 | 100 | 100 | 100 | 100 | 100 | 100 | 100 |
| rV/0.5% m-cr | | 1.75 | 1.81 | 1.84 | 1.84 | 1.90 | 1.91 | 1.90 | 1.91 |
| Moisture content | % | 0.044 | 0.057 | 0.014 | 0.021 | 0.051 | 0.162 | 0.035 | 0.011 |
| Tg/DSC | °C. | 152 | 149 | 148 | 148 | 147 | 147 | 145 | 140 |
| Mp/DSC | °C. | — | — | — | 233 | 235 | 238 | 239 | 251 |
| Melt. enthal./DSC | J/g | — | — | — | 6.7 | 9.1 | 11.5 | 20 | 22 |
| Properties | | | | | | | | | |
| T540 nm/3 mm | % | 80.0 | 82.6 | 84.4 | 84.9 | 85.3 | 84.4 | 83.4 | 80.5 |
| YI/3 mm | | 4.5 | 3.0 | 2.1 | 1.6 | 0 | 0 | 2.5 | 4.2 |
| Charge no. | | S596 | 6551 | 6552 | 6601 | 6600 | 6599 | 6598 | 6554 |
| Bending stress | MPa | 75 | 47 | 54 | 47.5 | 52 | 48 | 49 | 49 |
| Number of cycles to break in fatigue test after Wöhler | 1000 cycles | 100 | 61 | 173 | 395 | 342 | 386 | 362 | 193 |
| NIS/23° C./dry | KJ/m² | 11 | 12 | 12 | 11 | 11 | 11 | 12 | 13 |
| Elong. at break/dry | % | 100 | 142 | 162 | 155 | 148 | 143 | 140 | 126 |
| Stress at break/dry | MPa | 50 | 57 | 62 | 60 | 58 | 56 | 55 | 50 |
| Elast. modulus/dry | MPa | 1530 | 1490 | 1460 | 1460 | 1460 | 1460 | 1450 | 1430 |
| SCR/n-hexane | MPa | 43 | 44 | 52 | 59 | 59 | 59 | 59 | 58 |
| SCR/acetone | MPa | 38 | 41 | 59 | 59 | 59 | 59 | 59 | 58 |
| SCR/isopropanol | MPa | 15 | 10 | 19 | 22 | 52 | 59 | 59 | 58 |

The analysis of the PACM (dicycane=4,4'-diaminodicyclohexylmethane; CAS-Nr. 1761-71–3 from the company BASF) trans, trans amount was determined by the GC method by a FID detector. Therefore, 100 mg of dicycane are dissolved in 10 mL of dichloromethane.

| Peak | Retention time [min.] | Amount [area %] | Assignment Isomers |
|---|---|---|---|
| 1 | 9.747 | 0.770 | |
| 2 | 9.804 | 0.374 | |
| 3 | 9.995 | 0.402 | |
| 4 | 10.097 | 47.248 | Trans, trans |
| 5 | 10.202 | 41.469 | |
| 6 | 10.276 | 9.737 | |
| | sum | 100.000 | |

The measurement of the relative viscosity (rV) is performed with solutions in 0.5% of m-cresol at 23° C.

Glass transition temperatures (Tg), melting temperature and melting enthalpy were measured on an usual DSC device having heating rates of 20° C. per minute.

The measurement of the light transmission (T540 nm) was performed on an UV spectrometer of the company Perkin Elmer on plates having a thickness of 3 mm. The absolute transparency of the moulding materials which are produced on small pilot plants show due to their lower purity lower values compared to moulding materials which are produced on large-scale plants, as experience shows. But, relative comparisons are perfectly possible.

The measurement of the Yellow Index (YI) was performed according to ASTM D 1925 on plates having a thickness of 3 mm.

The residual mechanical properties such as elongation at break, stress at break and elastic modulus were determined according to ISO 527.

For measuring the stress crack resistance (SCR) the ISO tension test bars were fixed on a template having defined edge fiber elongation (bending stress) and dipped for 60 sec in the solvent to be tested. The given values in MPa represent the applied bending stress until which no cracks can be seen visually in the specimen.

The measurement of the number of cycles to break in a fatigue test after Wöhler were performed in the form of "stress-number curves" on a device of the company Dyna Mess, CIMTronic 2000 according to DIN53442 and ISO 178. The number of cycles to break at an initial bending stress of approx. 50 MPa is indicated.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A transparent polyamide moulding material having a melting enthalpy between 0 and 12 J/g and the polyamides comprising:
  A. 100 mole-% of a diamine mixture having approximately 10 to about 70 mole-% of PACM [bis-(4-amino-cyclohexyl)-methane] with less than 50 wt.-% of trans, trans-isomer and approximately 90 to about 30 mole-% of MACM [bis-(4-amino-3-methyl-cyclohexyl)-methane], and B. 100 mole-% of long-chain aliphatic dicarboxylic acids having 8 to 14 C atoms or mixtures of these dicarboxylic acids.

2. The transparent polyamide moulding material of claim 1 wherein for polyamide (A) 0 to about 10 mole-% is selected from the group consisting of aliphatic diamines having 6 to 12 C atoms, cycloaliphatic, alkyl-substituted cycloaliphatic, branched aliphatic diamines, multiamines having 3 to 12 amino groups and mixtures thereof.

3. The transparent polyamide of claim 1 wherein for polyamide (B) 0 to about 10 mole-% is selected from the group consisting of aromatic and cycloaliphatic dicarboxylic acids having 8 to 16 C atoms.

4. The transparent polyamide moulding material of claim 3 wherein the polyamide (B) is selected from the group consisting of isophthalic acid, terephthalic acid, naphthalenedicarboxylic acid, cyclohexanedicarboxylic acid and mixtures thereof.

5. The transparent polyamide moulding material of claim 2 wherein, 0 to about 10 mole-% of the other long-chain aliphatic diamines and 0 to about 10 mole-% of the other long-chain aliphatic dicarboxylic acids are added as 0 to about 20 mole-% of ω-aminocarboxylic acids having 6 to 12 C atoms or lactams having 6 to 12 C atoms.

6. The transparent polyamide moulding material of claim 1, comprising:
A. 100 mole-% of a diamine mixture having approximately 30 to about 70 mole-% of PACM [bis-(4-aminocyclohexyl)-methane] with less than 50 wt.-% of trans, trans-isomer and 70–30 mole-% of MACM [bis-(4-amino-3-methyl-cyclohexyl)-methane] and
B. 100 mole-% of an acid selected from the group consisting of dodecanedioic acid (DDS), sebacic acid (SS), azelaic acid (AS) and mixtures thereof.

7. The transparent polyamide moulding material of claim 1, comprising:
A. 100 mole-% of a diamine mixture having approximately 40 to about 70 mole-% of PACM [bis-(4-aminocyclohexyl)-methane] with less than 50 wt.-% of trans, trans-isomer and 60 to about 30 mole-% of MACM [bis-(4-amino-3-methyl-cyclohexyl)-methane] and
B. 100 mole-% of dodecanedioic acid.

8. The transparent polyamide moulding material of claim 1, comprising:
A. 100 mole-% of a diamine mixture having approximately 50 to about 70 mole-% of PACM [bis-(4-aminocyclohexyl)-methane] with less than 50 wt.-% of trans, trans-isomer and 50 to about 30 mole-% of MACM [bis-(4-amino-3-methyl-cyclohexyl)-methane] and
B. 100 mole-% of dodecanedioic acid.

9. The transparent polyamide moulding material of claim 1, comprising:
A. 100 mole-% of a diamine mixture having approximately 50 to about 70 mole-% of PACM [bis-(4-aminocyclohexyl)-methane] with less than 50 wt.-% of trans, trans-isomer and approximately 50 to about 30 mole-% of MACM [bis-(4-amino-3-methyl-cyclohexyl)-methane] and
B. 100 mole-% of dodecanedioic acid.

10. The transparent polyamide moulding material of claim 1, wherein adjusting the relative viscosity, as measured in 0.5% of m-cresol solution, to 1.65 to about 2.00, either diamine or dicarboxylic acid excesses are used in amounts of from 0.01 to 1 mole-% in the polycondensation.

11. The transparent polyamide moulding material of claim 1 wherein at least one monoamine or monocarboxylic acid modifier is used in amounts of from 0.01 to 2.0 wt.-%, in a polycondensation reaction.

12. The transparent polyamide moulding material of claim 11, wherein an acid or amine selected from the group consisting of benzoic acid, acetic acid, propionic acid, stearylamine and mixtures thereof is used as a modifier.

13. The transparent polyamide moulding material of claim 11, wherein the modifier has amine or carboxylic acid groups and comprises HALS or tertiary butylphenol stabilizer groups.

14. The transparent polyamide moulding material of claim 11, wherein the acid or amine is selected from the group consisting of triacetone diamine and isophthalic acid di-triacetone diamine derivatives.

15. The transparent polyamide moulding material of claim 1, wherein phosphoric acids selected from the group consisting of $H_3PO_2$, $H_3PO_3$, $H_3PO_4$, salts thereof and organic derivatives thereof, which lead simultaneously to reduction of the discoloration during processing, are used in amounts in the range of from approximately 0.01 to about 0.5 wt.-%, as catalysts for accelerating the polycondensation reaction.

16. The transparent polyamide moulding material of claim 1, wherein aqueous emulsions containing silicones or silicone derivates are used in the range of from approximately 0.01 to about 1.0 wt.-%, for 10% emulsion as defoaming agents for preventing foam formation during degassing.

17. The transparent polyamide moulding material of claim 1, wherein stabilizers are added before a polycondensation to the formulation in amounts of from approximately 0.01 to about 0.5 wt.-%.

18. The transparent polyamide moulding materials of claim 17, comprising tertiary butylphenols stabilizers or HALS stabilizers.

19. A method for producing a polyamide moulding material comprising the steps of polycondensing polyamides in a pressure vessel with a pressure phase at 260 to about 310° C., a pressure release phase at 260 to about 310° C., a degassing phase at 260 to about 310° C., wherein the polyamide moulding materials are subsequently discharged in strand form, cooled in a water bath with 5 to about 80° C. and pelletized and the pellets are dried to a water content of below 0.06%.

20. The method for producing the polyamide moulding material of claim 19, wherein additives are applied on the hot pellets during drying.

21. The method of claim 20 including the step of simultaneously circulating the pellets.

22. The method of claim 20, wherein the additives are applied by melting the additives onto the hot pellets.

23. The method for producing polyamide moulding material of claim 20, wherein the additives comprise lubricants, dyes, and stabilizers.

24. The method for producing the polyamide moulding material of claim 20, wherein the additives are chosen from the group consisting of stabilizers, lubricants including paraffin oils or stearates, dyes, fillers, impact modifiers including terpolymers made of ethylene glycidyl methacrylate, or maleic anhydride grafted polyethylenes, propylenes, reinforcing agents including transparent nano-scale fillers.

25. The method for producing the polyamide moulding material of claim 20, wherein the additives are chosen from the group consisting of nano-silicates, glass spheres, glass fibres and mixtures thereof.

26. The method of claim 20, wherein the additives are incorporated by extrusion on an extruder with melt temperatures of between 250 to 350° C. in the polyamide moulding materials.

27. The method of claim 19 including the step of reducing a resulting yellow tinge of the polyamide moulding material by adding a phosphoric compounds.

28. The method of claim 27 wherein the phosphoric compound is H₃PO₃.

29. The method for producing polyamide moulding material of claim 19 including the step of adding a stabilizer selected from the group consisting of TINUVIN 770, TINUVIN 312 and a tertiary butylphenol antioxidant agent selected from the group consisting of IRGANOX 1010, IRGANOX 1070, IRGANOX 1098.

30. The method for producing polyamide moulding material of claim 19, comprising the step of adding additives by extrusion methods including a UV absorber having benztriazine structure filtering completely out wavelengths less than 400 nm in amounts of from approximately 0.1 to about 1.0 wt.-%.

31. The method for producing polyamide moulding material of claim 19, wherein blends are obtained from a mixture of 100 to about 30 wt.-% of the transparent polyamide moulding material and 0 to about 70 wt.-% of polyamide 12 or polyamide 11 or copolyamides thereof by an extrusion method with melt temperatures between 250 to about 350° C., wherein the blend forms a second microcrystalline phase having a melting point of 170 to about 175° C.

32. A method for producing transparent moulded articles having a melting enthalpy between 0 and 12 J/g and the polyamides comprising:
A. 100 mole-% of a diamine mixture having 10 to about 70 mole-% of PACM [bis-(4-amino-cyclohexyl)-methane] with less than 50 wt.-% of trans,trans-isomer and 90 to about 30 mole-% of MACM [bis-(4-amino-3-methyl-cyclohexyl)-methane],
B. 100 mole-% of long-chain aliphatic dicarboxylic acids having 8 to 14 C atoms or mixtures of these dicarboxylic acids,
comprising the steps of injection-compression the polyamides A and B material at a melt temperature of approximately 230 to about 320° C., wherein the mould has a temperature of approximately 40 to about 130° C.

33. The method for producing transparent moulded articles of claim 32, comprising the step of using an injection moulding method at melt temperatures of 230 to about 320° C.

34. The method of claim 32, wherein the mould applies an embossed printing on the hot moulded article after filling the cavity.

35. A method for producing surfaces of a moulded article from a polyamide moulding material having a melting enthalpy between 0 and 12 J/g and the polyamides comprising
A. 100 mole-% of a diamine mixture having 10 to about 70 mole-% of PACM [bis-(4-amino-cyclohexyl)-methane] with less than 50 wt.-% of trans,trans-isomer and 90 to about 30 mole-% of MACM [bis-(4-amino-3-methyl-cyclohexyl)-methane],
B. 100 mole-% of long-chain aliphatic dicarboxylic acids having 8 to 14 C atoms or mixtures of these dicarboxylic acids,
comprising the step of preparing lenses for spectacles by an expansion injection-compression moulding process using the polyamides A and B.

36. The method of claim 35, wherein cavities having wall thicknesses of from 1 to about 5 mm are filled and then the mould cavity is spread out to higher wall thicknesses at permanent filling.

37. A method for producing sheets, pipes and semi-finished products in single- or multi-layer construction from a transparent polyamide moulding having a melting enthalpy between 0 and 12 J/g and the polyamides comprising:
A. 100 mole-% of a diamine mixture having 10 to about 70 mole-% of PACM [bis-(4-amino-cyclohexyl)-methane] with less than 50 wt.-% of trans,trans-isomer and 90 to about 30 mole-% of MACM [bis-(4-amino-3-methyl-cyclohexyl)-methane],
B. 100 mole-% of long-chain aliphatic dicarboxylic acids having 8 to 14 C atoms or mixtures of these dicarboxylic acids,
comprising the step of using extrusion methods with melt temperatures between 250 to about 350° C. to produce sheets, pipes, and semi-finished products from the polyamides A and B.

38. The method of claim 37, wherein depending on a compatibility of the different layer materials, bonding agents in the form of corresponding copolymers or blends of polymers of the layer materials can be used.

39. A method for producing hollow bodies and bottles in single- or multi-layer construction from a transparent polyamide moulding material having a melting enthalpy between 0 and 12 J/g and the polyamides comprising:
A. 100 mole-% of a diamine mixture having 10 to about 70 mole-% of PACM [bis-(4-amino-cyclohexyl)-methane] with less than 50 wt.-% of trans,trans-isomer and 90 to about 30 mole-% of MACM [bis-(4-amino-3-methyl-cyclohexyl)-methane],
B. 100 mole-% of long-chain aliphatic dicarboxylic acids having 8 to 14 C atoms or mixtures of these dicarboxylic acids,
comprising the step of using injection blow methods to produce hollow bodies and bottles from the polyamides A and B.

40. The method of claim 39 including the step of using injection stretch-blow methods.

41. The method of claim 39 including the step of using extrusion blow methods.

42. A method for producing viewing glasses for heating techniques with direct oil contact, filter cups for drinking water treatment and media filtration, baby bottles, bottles for carbonating, dinner-service, flowmeters for gases or liquid media, clock cases, wrist watch cases, lamp cases, protection coverings, glazings, sport and leisure articles, and reflectors for car lamps and sensors comprising the step of using:
A. 100 mole-% of a diamine mixture having 10 to about 70 mole-% of PACM [bis-(4-amino-cyclohexyl)-methane] with less than 50 wt.-% of trans,trans-isomer and 90 to about 30 mole-% of MACM [bis-(4-amino-3-methyl-cyclohexyl)-methane], and
B. 100 mole-% of long-chain aliphatic dicarboxylic acids having 8 to 14 C atoms or mixtures of these dicarboxylic acids to produce the products.

43. A method for producing eyeglasses comprising the step of using:
A. 100 mole-% of a diamine mixture having 10 to about 70 mole-% of PACM [bis-(4-amino-cyclohexyl)-methane] with less than 50 wt.-% of trans,trans-isomer and 90 to about 30 mole-% of MACM [bis-(4-amino-3-methyl-cyclohexyl)-methane],
B. 100 mole-% of long-chain aliphatic dicarboxylic acids having 8 to 14 C atoms or mixtures of these dicarboxylic acids,
to produce the eyeglasses having lenses.

44. The method of claim 43 comprising the step of using a dipping method in alcoholic, ester-containing, ketone-containing or water-based pigment solutions.

45. The method of claim 44, wherein the lenses of the eyeglasses are corrected by dipping in acetone and coated by usual hard coat lacquers.

46. The method for producing glasses of claim 43, wherein the lenses are coated with a vapor-deposition methods with metals, lumenized, metal-coated or finished in other usual form.

47. The method for producing glasses of claim 43 comprising the step of overmoulding polarizing sheets or composites of a polarizing sheet, a layer of an adhesive and a layer of the polyamide moulding material on both sides.

48. The method for producing glasses of claim 43, wherein the eyeglasses are produced by overmoulding protecting sheets finished with phototropic substances.

49. The method for producing glasses of claim 43, wherein the eyeglasses can be adapted in all spectacle frames customary in trade without risk for stress cracks in the spectacle glass being caused by plasticized spectacle frames or cracks or breaks being generated in the spectacle glass by too high adapting stresses of metal frames.

50. The method of claim 43 including the step of producing spectacle frames and spectacle glasses directly in the form of an integral complete spectacle consisting of glass, frame and bow.

51. The method of claim 43 including the step of using joining methods for modern spectacle design with screwed connections are applied wherein the bores are directly arranged in the spectacle glass.

52. The method of claim 43 including the step of producing clamped or detachable snap connections, comprising the step of using at least one fixing element in is placed directly in the contour of the spectacle glass.

53. A method for producing moulded articles comprising:

A. 100 mole-% of a diamine mixture having 10 to about 70 mole-% of PACM [bis-(4-amino-cyclohexyl)-methane] with less than 50 wt.-% of trans,trans-isomer and 90 to about 30 mole-% of MACM [bis-(4-amino-3-methyl-cyclohexyl)-methane], B. 100 mole-% of long-chain aliphatic dicarboxylic acids having 8 to 14 C atoms or mixtures of these dicarboxylic acids, comprising the step of joining the polyamides A and B to itself using a method chosen from the group consisting of ultrasonic welding, glowing wire welding, friction welding, spin welding or by laser welding after finishing with lasing dyes having absorption in the range of 800 to 2000 nm.

* * * * *